(12) United States Patent
Pagano

(10) Patent No.: US 8,904,922 B2
(45) Date of Patent: Dec. 9, 2014

(54) INFUSION ASSEMBLY FOR A MACHINE FOR THE PREPARATION OF BEVERAGES

(76) Inventor: Gaetano Pagano, Florence (IT)

( * ) Notice: Subject to any disclaimer, the term of this patent is extended or adjusted under 35 U.S.C. 154(b) by 738 days.

(21) Appl. No.: 13/142,781

(22) PCT Filed: Dec. 29, 2009

(86) PCT No.: PCT/IB2009/055982
§ 371 (c)(1),
(2), (4) Date: Jun. 29, 2011

(87) PCT Pub. No.: WO2010/076765
PCT Pub. Date: Jul. 8, 2010

(65) Prior Publication Data
US 2011/0265660 A1    Nov. 3, 2011

(30) Foreign Application Priority Data

Dec. 30, 2008    (IT) .............................. TO2008A1007

(51) Int. Cl.
*A47J 31/34*    (2006.01)
*A47J 31/40*    (2006.01)
*A47J 31/36*    (2006.01)

(52) U.S. Cl.
CPC ............ *A47J 31/3633* (2013.01); *A47J 31/407* (2013.01); *A47J 31/3695* (2013.01); *A47J 31/3628* (2013.01)

USPC ........................... 99/295; 99/289 R; 99/302 P

(58) Field of Classification Search
USPC ..................... 99/295, 289 R, 302 P
See application file for complete search history.

(56) References Cited

U.S. PATENT DOCUMENTS

| | | | | |
|---|---|---|---|---|
| 5,479,848 | A | * | 1/1996 | Versini ............................ 99/287 |
| 5,823,096 | A | * | 10/1998 | Shih .............................. 99/302 P |
| 7,531,198 | B2 | * | 5/2009 | Cortese .......................... 426/433 |
| 2002/0088348 | A1 | * | 7/2002 | Cortese ........................... 99/295 |
| 2008/0134901 | A1 | * | 6/2008 | Cortese ........................... 99/295 |
| 2010/0173053 | A1 | * | 7/2010 | Ryser et al. .................... 426/431 |

FOREIGN PATENT DOCUMENTS

| | | | |
|---|---|---|---|
| WO | 2006/126230 | A1 | 11/2006 |
| WO | 2008/014830 | A1 | 2/2008 |

OTHER PUBLICATIONS

International Search Report PCT/IB2009/055982, Sep. 15, 2010.

* cited by examiner

*Primary Examiner* — Reginald L Alexander
(74) *Attorney, Agent, or Firm* — Sughrue Mion, PLLC

(57) ABSTRACT

An infusion assembly for a machine for the preparation of beverages. The infusion assembly (1) includes an abutment member (6) and a receiving member (7) adapted to assume, in a stationary support and guide structure (2), a separated open position, as well as a coupled closed position in which an infusion chamber is defined. The relative movement of said members (6, 7) is controlled using an electrical linear actuator (14).

6 Claims, 5 Drawing Sheets

… (1)

INFUSION ASSEMBLY FOR A MACHINE FOR THE PREPARATION OF BEVERAGES

CROSS REFERENCE TO RELATED APPLICATIONS

This application is a National Stage of International Application No. PCT/IB2009/055982 filed Dec. 29, 2009, claiming priority based on Italian Patent Application No. TO 2008A001007 filed Dec. 30, 2008, the contents of all of which are incorporated herein by reference in their entirety.

BACKGROUND OF THE INVENTION

This invention relates to an infusion assembly for a machine for preparing beverages, in particular coffee.

More specifically the invention concerns an infusion assembly comprising an operationally stationary support and guide structure, which has an abutment member and a related hollow receiving member, the receiving member being adapted to contain a quantity or dose of a substance, possibly pre-packaged in a pod or similar, for the preparation of a beverage; said members being capable of assuming a relative closed position in which they are coupled to each other in a fluid-tight manner to define an infusion chamber, and a separated open position; the abutment member being provided with means adapted to allow water and/or steam to be injected into the infusion chamber; electrically controlled actuating means being provided to cause relative displacements of said members between the open and closed positions.

One purpose of this invention is to propose such an improved dispensing assembly.

SUMMARY OF THE INVENTION

This and other objectives are realised according to the invention with an infusion assembly of the type specified above, characterised in that said actuating means include an electrical linear actuating device, connected to said support and guide structure and adapted to cause back and forth displacements of one of said members, and in particular the receiving member, in respect of the other, along a straight path.

According to another characteristic one of said members is provided with a radially protruding ring gasket, and in the closed position one of said members partially penetrates the other such that said ring gasket creates an essentially radial seal between them.

In one embodiment the support structure includes a pair of parallel rods to guide the movement of one of said members, and on said rods are swingably mounted essentially coplanar respective retaining jaws adapted to receive and retain a pod or similar inserted in the assembly between said members while the latter are in the relative open position; said jaws being openable to release the pod held, when said members are close to reaching the closed position, to enable the positioning of said pod in the infusion chamber.

BRIEF DESCRIPTION OF THE DRAWINGS

Further characteristics and advantages of the invention are set out in the detailed description below, provided purely as a non-limiting example, with reference to the attached drawings, in which.

DETAILED DESCRIPTION OF THE INVENTION

Figure 1:
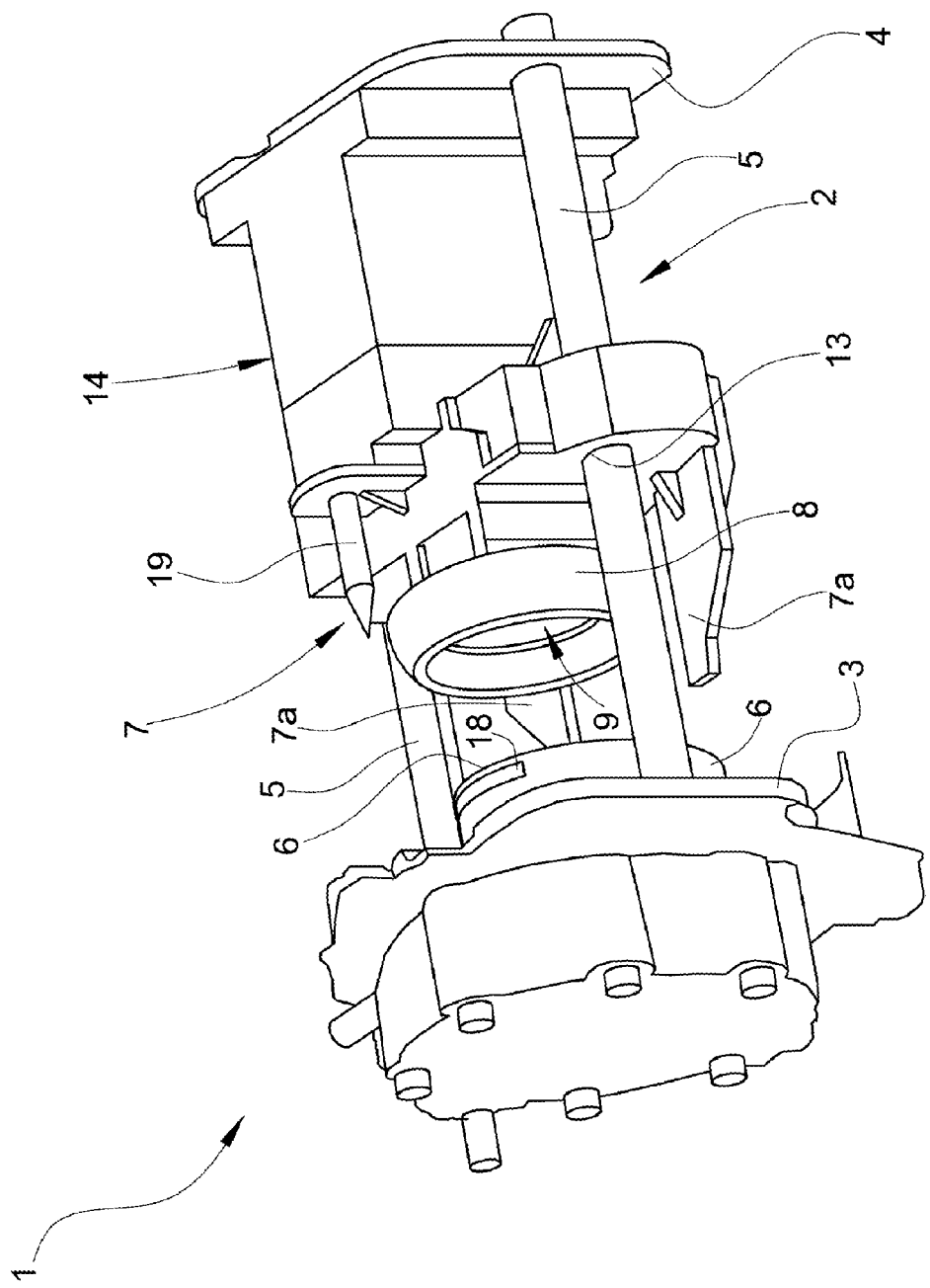
FIG. 1 is a perspective view of an infusion assembly according to this invention.
Figure 2A:
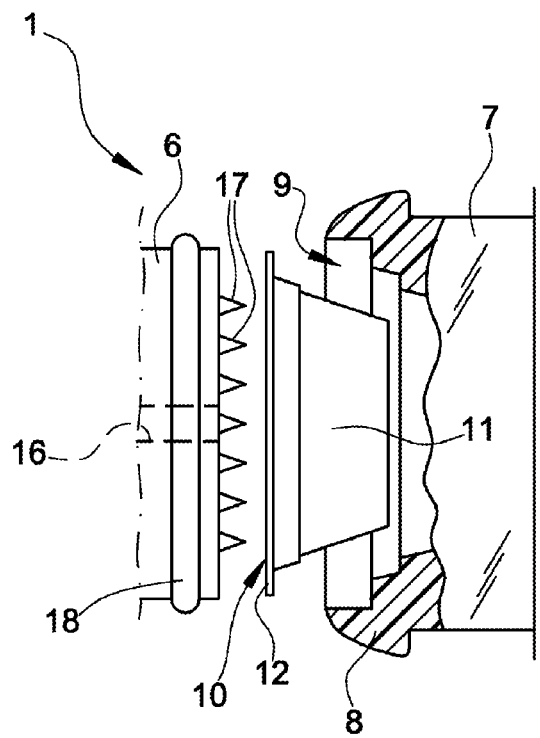
FIGS. 2a and 2b are partial axial cross sections of a part of the infusion assembly in FIG. 1, shown in a first and a second operating state.
Figure 2B:
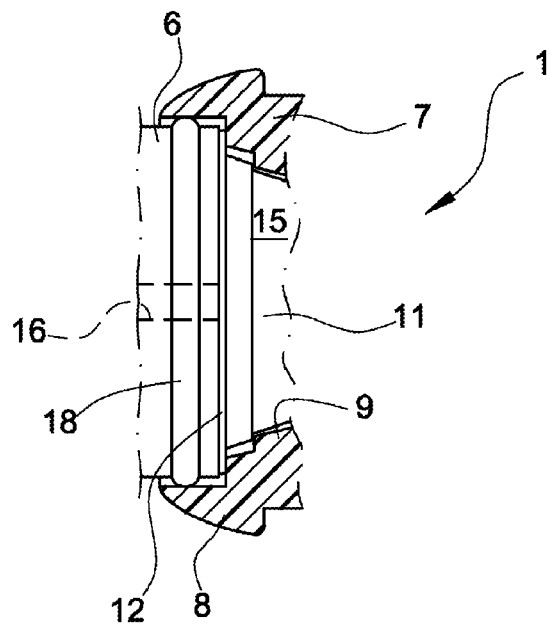

In FIGS. 1, 2a and 2b an infusion assembly according to the invention for a machine for preparing beverages, in particular hot beverages, such as coffee, is marked as a whole as 1.

The infusion assembly 1 is intended to be fitted to a machine for preparing beverages of a type known and therefore not illustrated.

This description and the attached drawings show an infusion assembly 1 for a pod machine, but the invention applies equally to infusion assemblies in which a dose of loose substance, i.e. not pre-packaged in pods, capsules or similar, is used to prepare the beverage.

In the embodiment illustrated by way of example the infusion assembly 1 includes an operationally stationary support and guide structure 2 including two header plates 3 and 4 facing one another and interconnected by means of a pair of parallel rods 5, preferably cylindrical.

The structure 2 bears an abutment member 6 and a related hollow receiving member 7 facing one another.

The receiving member 7 includes an essentially cup-shaped body 8 defining a cavity 9 adapted to contain a dose of substance for the preparation of the beverage, in particular a pod or capsule such as the one marked as 10 in FIGS. 2a and 2b. The pod 10 illustrated is of a known type, and includes a cup-shaped body 11 enclosed by a sealing cover 12, the edge of which protrudes radially.

The abutment member 6 is connected to the plate 3, while the receiving member 7 is mounted on the rods 5, moveably to and from the receiving member 6. For this purpose two parallel through-holes 13 are provided in the receiving member 7 through which the rods 5 pass.

The displacements of the receiving member 7 relative to the abutment member 6 are appropriately controlled by an electrical linear actuating device shown in full as 14 in FIG. 1.

The members 6 and 7 are in particular capable of assuming a relative separated open position, shown in FIG. 1, in which a pod 10 inserted in the machine may be placed between said members 6 and 7 where it is for example held by a jawed retaining device explained in further detail below.

Activation of the linear actuator 14 is then adapted to move the receiving member 7 towards the abutment member 6, until it reaches a relative closed position, shown in FIG. 2b, passing through the intermediate position shown in FIG. 2a.

In the aforementioned intermediate position the pod 10, released (for example as described below) from the related retaining device, is "caught" between the members 6 and 7 and enters the cavity 9 of the member 7.

In the closed position the members 6 and 7 are joined to one another in a fluid-tight manner and define a closed infusion chamber 15 containing the pod 10.

With reference to FIGS. 2a and 2b, the abutment member 6 in a known manner has at least one duct 16 communicating with passages in related perforating points 17 that in the closed state penetrate the cover 12 of the pod 10 to enable a flow of water and/or steam to be injected into said pod.

Appropriately, the abutment member 6 is fitted externally with a radially protruding ring gasket 18. In the closed state (FIG. 2*b*) the end of the abutment member 6 penetrates the body 8 of the receiving member 7 such that the gasket 18 is radially compressed against the opening of the body 8 creating therein, advantageously, an essentially radial seal.

With reference to FIG. 1, the receiving member has an appropriate longitudinal centring peg 19 intended to be inserted in a corresponding aperture or seat in the abutment member 6 in the relative closed position.

Figure 3:
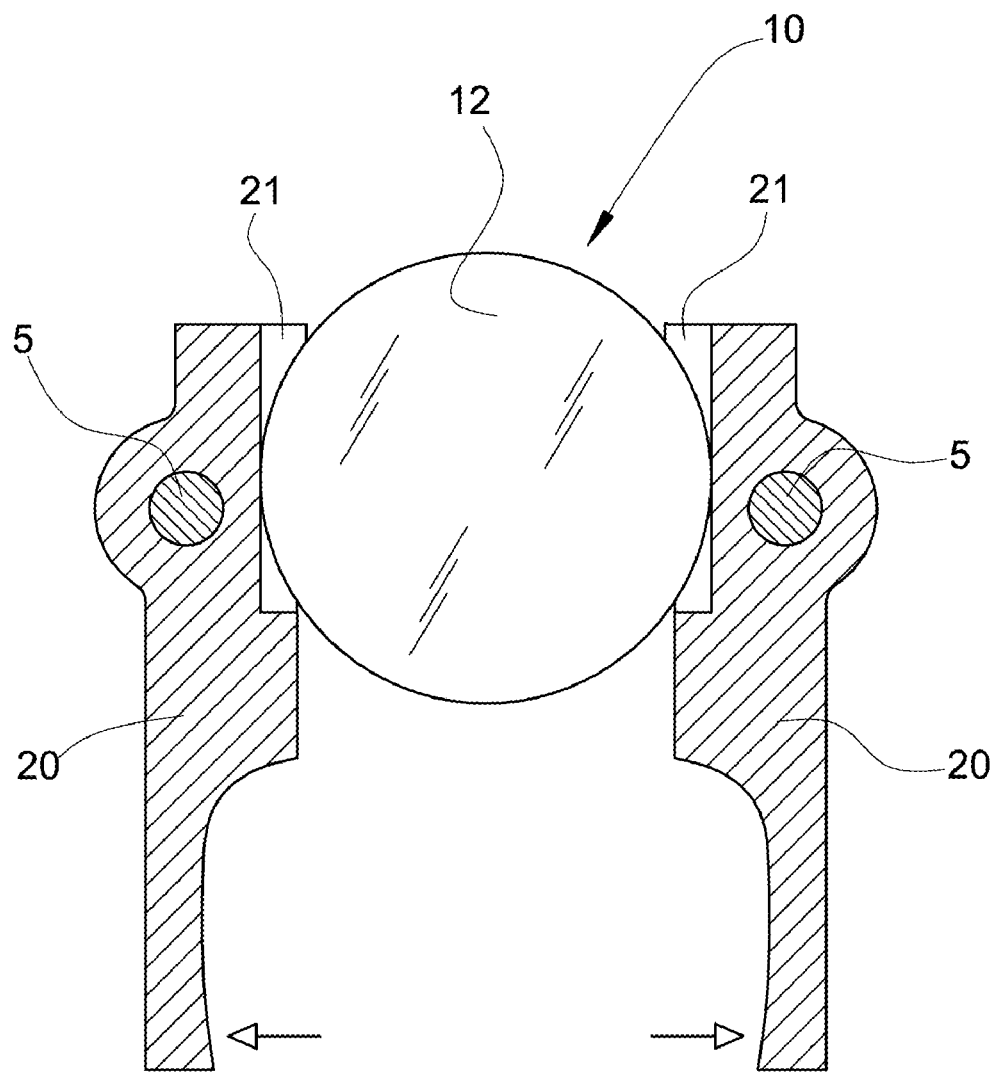
FIG. 3 is a partially cross sectioned front view showing a jawed device for holding a pod in an infusion assembly according to this invention.

As shown in FIG. 3, to hold the pod 10 between the members 6 and 7 during the phase in which they are brought closer together towards the closing position a device including a pair of retaining jaws 20 mounted swingably on the rods 5, in the same transversal plane, may be used.

These jaws have upper respective vertical guiding and retaining recesses 21 which engage the perimeter edge of the cover 12 of a pod 10 inserted into the machine containing the infusion assembly.

The arrangement is such that the pod 10 is held there resting on the lower extremities of the aforementioned recesses, until the jaws 20 are opened out below, as shown by the arrows in FIG. 2*b*, by interference with corresponding spur 7*a* of the receiving member 7 (FIG. 1), thus releasing the pod which is then "caught" between the members 6 and 7.

Once the drink has been dispensed through an outlet in the receiving member not visible in FIGS. 1-3, as soon as the member 7 is removed from the member 6, the empty pod 10 may be discharged by gravity, upon its ejection from the cavity 9 using an expulsion spring provided therein but not visible in said figures.

Figure 4:
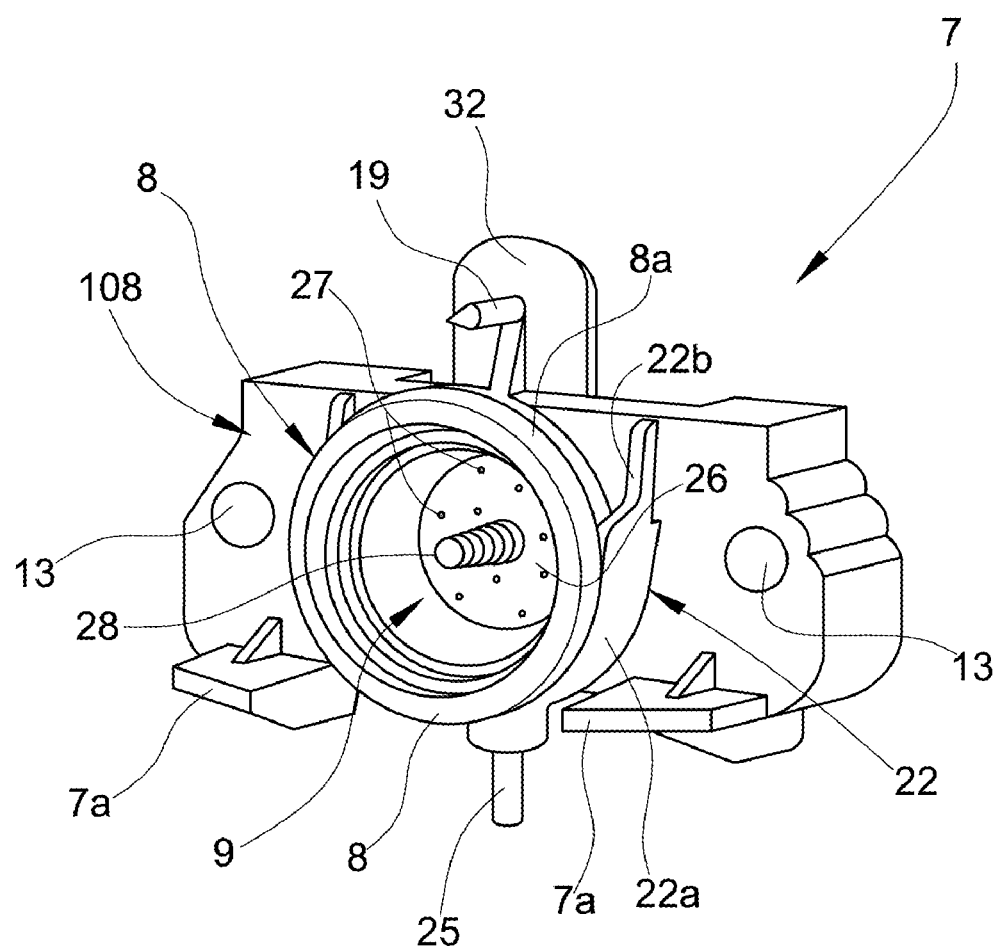
FIGS. 4 and 5 are partial perspective views of another assembly according to the invention with a separable and removable infusion chamber.
Figure 5:
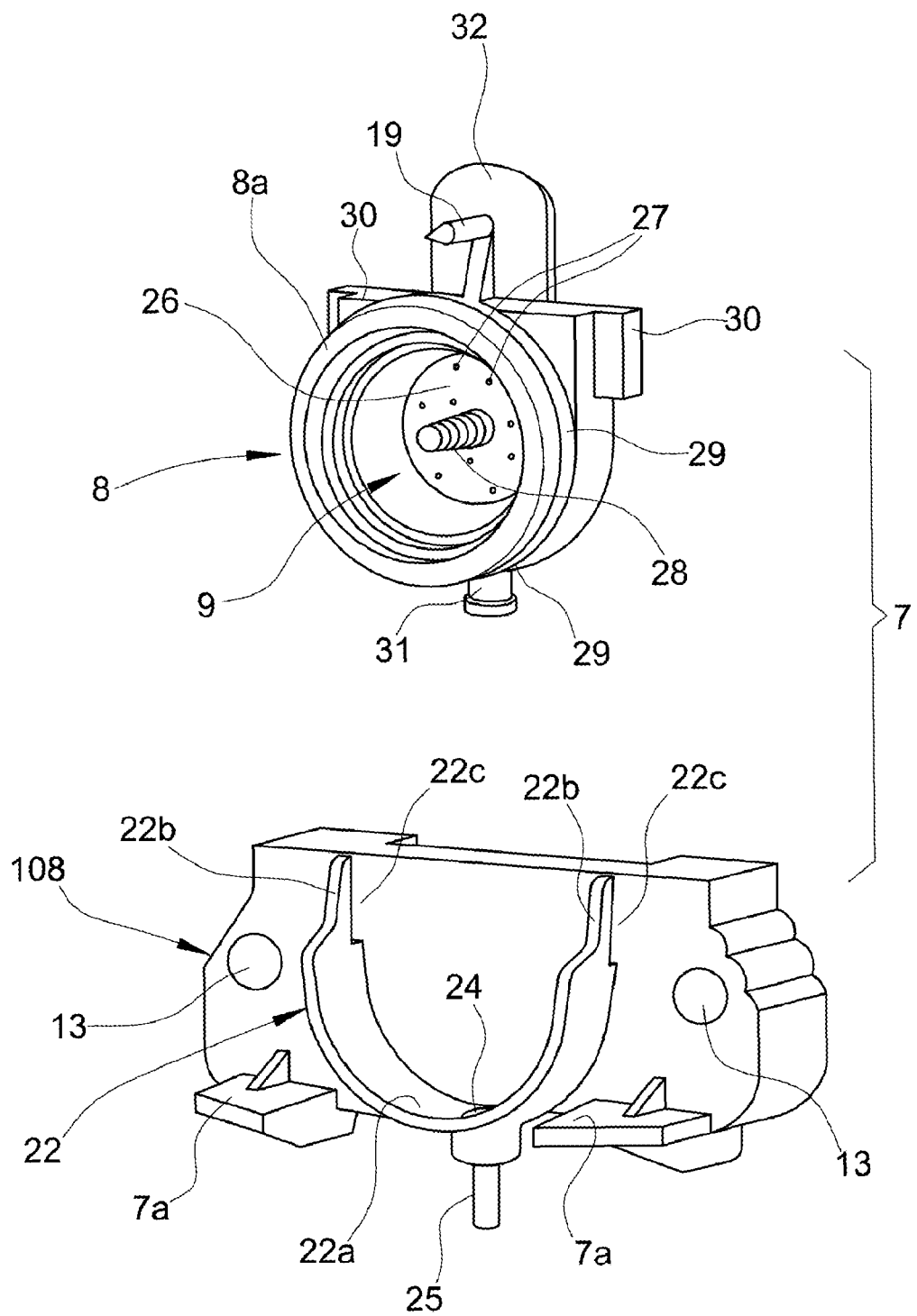

FIGS. 4 and 5 show an advantageous alternative embodiment of the receiving member 7. In those figures the parts and members already described have been re-allocated the same reference numbers as used before.

In said variant the receiving member 7 comprises two main bodies 8 and 108 that are mutually different and mutually coupleable and separable (see in particular FIG. 5).

The body 108 is mounted slidingly on the interconnection and guide rods 5 and has a frontal retaining formation 22 in the form of an essentially U-shaped protruding strap, with a semi-circular lower part 22*a* and upper extremities 22*b* separated from the front face of the body 108, such as to define the corresponding notch seats 22*c*.

In the lower part of the formation 22 there is an aperture 24 (FIG. 5) communicating with a lower spout 25 for dispensing the beverage.

The body 8 forms the cavity 9, in which is mounted a base plate 26 fitted with perforated and perforating points 27 intended to penetrate the back wall of a pod 10 to enable the beverage to be extracted. The plate 26 is connected to an expulsion spring 28 intended to eject the empty pods from the cavity 9.

The body 8 has a front collar 8*a* behind which is defined an annular groove 29 which engages the lower semicircular part 22*a* of the formation 22 of the body 108 when said bodies 8, 108 are coupled together. The body 8 also has a pair of opposed lateral spurs 30 (FIG. 5) adapted to engage in the notch seats 22*c* of the body 108.

In the lower part of the cavity 9 of the body 8 there is an outflow aperture connected to an outlet spout 31 (FIG. 5) intended to engage the aperture 24 of the body 108.

In the upper part the body 8 forms a grip spur 32 turned upwards, intended to be grasped by a user wishing to uncouple the body 8 from the body 108, to remove the body 8 from the machine incorporating the assembly 1. The removability of the body 8 is particularly advantageous in facilitating the periodic cleaning of the cavity or chamber 9 and the related points 27.

Re-coupling the body 8 to the body 108 is also extremely rapid and easy.

Naturally, notwithstanding the invention principle, the means of implementation and the specific embodiments may vary greatly from that described and illustrated above purely by way of a non-limiting example, without thereby moving outside the scope of the invention as defined in the attached claims.

The invention claimed is:

1. An infusion assembly (1) for a machine for preparing beverages, comprising:
    an operationally stationary support and guide structure (2) that has an abutment member (6) and a related hollow receiving member (7), the receiving member (7) being adapted to contain a quantity of a substance for preparing a drink, said abutment member and said receiving member being configured to assume a relative closed position in which they are coupled together in a fluid-tight manner to define an infusion chamber (15), and a separated open position, the abutment member (6) being fitted with means (16) configured to enable water and/or steam to be injected into the infusion chamber (15);
    electrically controlled actuating means (14) for causing relative displacements of said abutment member and said receiving member between the open and closed positions;
    wherein said actuating means include an electrical linear actuating device (14) connected to said support and guide structure (2) and configured to cause back and forth displacements in one of the receiving member and the abutment member in respect to the other of the receiving member and abutment member along a straight path,
    wherein the support and guide structure (2) includes a pair of parallel rods (5) to guide said displacement, and
    wherein on said rods are mounted coplanar swingably retaining jaws (20), configured to receive and hold said substance, inserted in the assembly (1) between said receiving member and said abutment member arranged in the open position, said jaws (20) being openable to release said substance held (10), when said members (6, 7) are close to reaching the relative closed position, to enable the positioning of said substance (10) in the infusion chamber (15).

2. The infusion assembly according to claim 1, in which one (6) of said members (6, 7) is provided with a radially protruding ring gasket (18), and in which in the closed position one (7) of said members (6, 7) partially penetrates the other (6) such that said ring gasket (18) creates between them an essentially radial seal.

3. The infusion assembly according to claim 2, in which said ring gasket (18) is mounted on the outside of the abutment member (6).

4. The infusion assembly according to claim 1, in which said jaws (20) can be opened by the mobile member (7).

5. The infusion assembly according to claim 1, in which the receiving member (7) comprises
    a first body (108), mounted in said support and guide structure (2), moveably to and from the abutment member (6), and
    a second body (8), insertable into and removable from the first (108), and in which there is a cavity (9) cooperating to define the infusion chamber (15) and in which may be provided a plurality of perforated points (27) intended to perforate a wall of a pod (10) holding said substance.

6. The infusion assembly according to claim 5, in which said second body (8) has a grip element (32) adapted to be grasped manually to insert/remove the first body (8) into/from the second body (108).

\* \* \* \* \*